(12) United States Patent
Mekid et al.

(10) Patent No.: US 8,893,563 B1
(45) Date of Patent: Nov. 25, 2014

(54) DIFFERENTIAL CAPACITANCE TORQUE SENSOR

(71) Applicant: King Fahd University of Petroleum and Minerals, Dhahran (SA)

(72) Inventors: Samir Mekid, Dhahran (SA); Igor Gilavdary, Minsk (BY)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 14/156,396

(22) Filed: Jan. 15, 2014

(51) Int. Cl.
*G01L 3/00* (2006.01)
*G01L 3/10* (2006.01)

(52) U.S. Cl.
CPC ..................................... *G01L 3/106* (2013.01)
USPC ................ 73/862.337; 73/514.32; 73/514.36; 73/514.29; 73/514.16; 257/415; 438/50; 324/660

(58) Field of Classification Search
CPC ........................... G01P 15/125; G01P 15/0802
USPC ............. 73/862.337, 514.32, 514.36, 514.38, 73/514.29, 514.16, 514.21, 514.18, 504.1, 73/504.14, 504.04; 257/415; 324/660; 438/50
See application file for complete search history.

(56) References Cited

U.S. PATENT DOCUMENTS

| | | | |
|---|---|---|---|
| 5,614,742 A | 3/1997 | Gessner et al. | |
| 6,308,569 B1 | 10/2001 | Stewart | |
| 7,578,190 B2 * | 8/2009 | Lin et al. | 73/514.32 |
| 7,610,809 B2 * | 11/2009 | McNeil et al. | 73/514.32 |
| 8,076,893 B2 | 12/2011 | Dong et al. | |
| 2003/0061878 A1 * | 4/2003 | Pinson | 73/514.33 |
| 2004/0160232 A1 | 8/2004 | Yue et al. | |
| 2005/0139942 A1 | 6/2005 | Eskridge et al. | |
| 2005/0145030 A1 * | 7/2005 | Elliott et al. | 73/514.32 |
| 2008/0173091 A1 * | 7/2008 | McNeil et al. | 73/514.32 |
| 2008/0236280 A1 * | 10/2008 | Johnson et al. | 73/504.14 |
| 2009/0031809 A1 * | 2/2009 | Lin et al. | 73/514.32 |
| 2009/0139330 A1 * | 6/2009 | Pavelescu et al. | 73/514.32 |
| 2009/0241662 A1 * | 10/2009 | Supino et al. | 73/514.32 |
| 2009/0255336 A1 * | 10/2009 | Horning et al. | 73/504.12 |

(Continued)

FOREIGN PATENT DOCUMENTS

CN 101271125 A 9/2008

*Primary Examiner* — Lisa Caputo
*Assistant Examiner* — Philip Cotey
(74) *Attorney, Agent, or Firm* — Richard C. Litman (57) ABSTRACT

A differential capacitance torque sensor utilizes multiple voltage sources in order to compensate for inherent electrical asymmetries in the sensor. A first voltage source having a voltage $V_1$ is electrically connected across a longitudinally-extending, conductive proof mass, a first upper capacitor $C_1$ and the second lower capacitor $C_4$. A second voltage source having a voltage $V_2$ is connected in series with the first voltage source, a second upper capacitor $C_3$ and a first lower capacitor $C_2$, such that the voltage $V_2$ is given by $$V_2 = \frac{\gamma}{\gamma + 1} V_1,$$

where $\gamma$ is a parameter defined as $$\gamma = \frac{C_2 + C_3}{C_1 + C_4} - 1.$$

4 Claims, 4 Drawing Sheets

(56) References Cited

U.S. PATENT DOCUMENTS

| | | | |
|---|---|---|---|
| 2010/0116632 A1* | 5/2010 | Smith et al. | 257/368 |
| 2010/0258951 A1* | 10/2010 | Gabara | 257/777 |
| 2011/0056297 A1 | 3/2011 | Classen | |
| 2011/0265568 A1* | 11/2011 | Stephanou et al. | 73/514.32 |
| 2011/0308330 A1* | 12/2011 | May | 73/862.69 |
| 2012/0297873 A1* | 11/2012 | Zou et al. | 73/504.12 |
| 2013/0333175 A1* | 12/2013 | Acar et al. | 29/25.35 |
| 2013/0333471 A1* | 12/2013 | Chien | 73/514.32 |

* cited by examiner

DIFFERENTIAL CAPACITANCE TORQUE SENSOR

BACKGROUND OF THE INVENTION

1. Field of the Invention

The present invention relates to capacitive accelerometers, and particularly to a differential capacitance inertial and gravity torque sensor using multiple voltage sources in order to compensate for inherent electrical asymmetries in the sensor, thus providing for a resonant mode of operation and enhanced sensitivity.

2. Description of the Related Art

Figure 1:
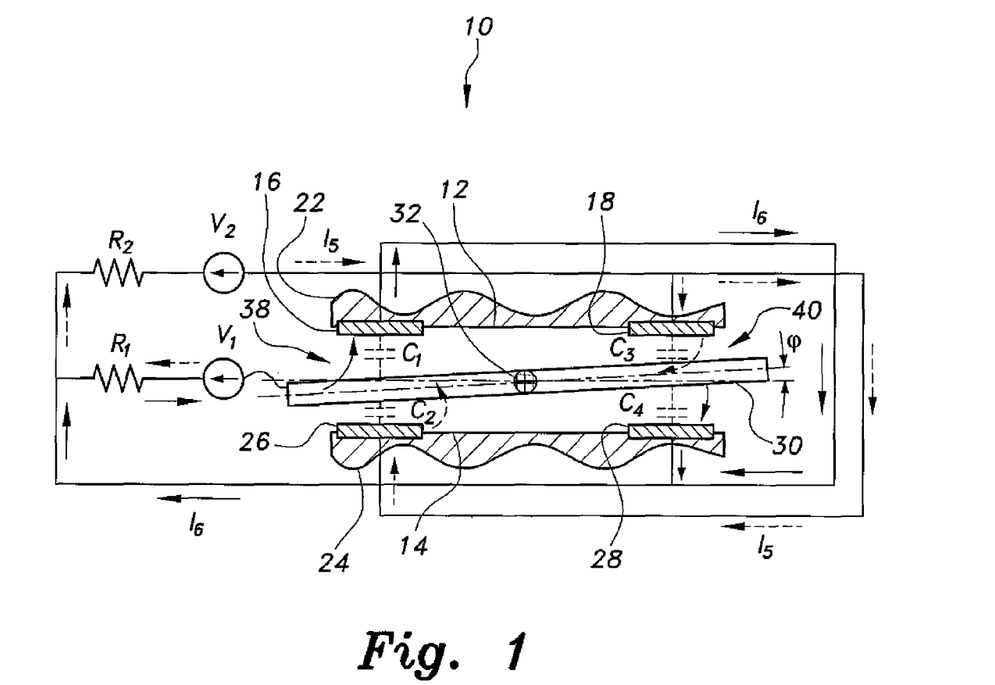
FIG. 1 schematically illustrates a differential capacitance torque sensor according to the present invention.

Pivotal three-layer capacitive accelerometers are well known in the art, such as shown in U.S. Pat. No. 7,610,809, issued to McNeil et al. (the '809 patent). FIG. 1 and Column 1, line 36 to Column 2, line 41 of the '809 patent are hereby incorporated by reference. For example, FIG. 1 of the "809 patent shows an exploded side view of a conventional three-layer capacitive accelerometer constructed as a conventional hinged or "teeter-totter" type sensor. The capacitive accelerometer includes a pair of static substrates, which have opposed parallel planar faces. The substrates are spaced from one another and each has a plurality of metal electrode elements, of a predetermined configuration, deposited on one surface to form respective capacitor electrodes or "plates". In an exemplary scenario, electrode elements operate as an excitation or sensing electrode to receive stimulating signals. The other electrode elements operate as the feedback electrodes for electrostatic rebalance. A single set of electrode elements operate as both sensing and feedback electrodes when the feedback signal is superimposed on the sensing signal.

In the capacitive accelerometer described in the '809 patent, a movable element, commonly referred to as a "proof mass", is flexibly suspended between substrates by one or more rotational flexures situated at elevated attachment points for rotation about a rotational axis to form different sets of capacitors with electrodes. The movable element moves in response to acceleration, thus changing its position relative to the static sensing electrodes. This change in position results in a set of capacitors whose difference (i.e., a "differential capacitance") is indicative of acceleration. Another set of capacitors for electrostatic rebalance is made up of the movable element and feedback electrodes. The feedback electrodes function to drive movable element to its reference position balanced between the sensing elements and maintain it there.

When in use as a teeter-totter type accelerometer the capacitive accelerometer described in relation to FIG. 1 of the '809 patent, a first section of the movable element, on one side of a rotational axis, is formed with relatively greater mass than a second section of the movable element, on the other side of the rotational axis. The greater mass of first section is typically created by offsetting the rotational axis such that an extended portion of the first section is formed distal from the rotational axis. In addition, the electrode elements are sized and spaced symmetrically with respect to the longitudinal axis L of the movable element. Similarly, the electrode elements are further sized and spaced symmetrically with respect to the rotational axis.

As noted in the '809 patent, two-layer and three-layer capacitive sensors having a teeter-totter configuration, however, tend to suffer from a number of drawbacks. In order to provide more capacitive output and, thus, better circuit performance (e.g., lower noise), the teeter-totter type capacitive accelerometer must have a relatively large proof mass. However, a large proof mass requires more die area, thus increasing cost and package size. Further, a proof mass should rotate as a rigid body, but the tendency for a proof mass to deform or bend increases in relation to its increasing size, particularly when it is subjected to high accelerations. This deformation or bending causes a non-linear effect that results in decreased accuracy of the sensor. For example, this nonlinearity can create direct current (DC) offset in the sensor output and possibly cause dysfunction of the system in which the accelerometer is deployed.

As further noted in the '809 patent, a particular problem of three-layer teeter-totter configurations, such as that illustrated in FIG. 1 therein, is that both the sensing electrodes and the feedback electrodes are clustered proximate the rotational axis. This configuration is inefficient in that the surface area of an extended portion, generally termed a "shield area", of the movable element is unused. Further, the surface areas of the electrodes are relatively small due to their clustered configuration about the rotational axis. A smaller surface area of the sensing electrodes results in a lower capacitive output. A smaller surface area of the feedback electrodes provides insufficient actuation given voltage levels available from the feedback circuit.

Conventional capacitive sensors typically suffer from a number of drawbacks, including, for example, unwanted noise in the output signal. Capacitive accelerometers sense a change in electrical capacitance, with respect to acceleration, in order to vary the output of energized circuits. This energized circuit includes additional electronic gauges and high frequency generator, thus increasing susceptibility to additional electrical noise in the sensor output signals, limiting sensor sensitivity. Additionally, the sensitivity of a sensor, such as that shown in '809 patent, is limited because an elastic hanger of the proof mass (PM) has to be rigid enough to be used when this sensor is mounted on a vehicle or moving base, thus a PM's rotational natural frequencies about the rotational axis are on the order of about 12 Hz. Further, it is impossible to considerably change natural frequency oscillations of the PM in the '809 patent's sensor because of inherent electric asymmetry, which will be always present after sensor fabrication. Finally, even in principle, the sensor of the '809 patent cannot be used for measuring second derivative gravity potential because of a PM rotational axis offset between first and second ends, along with the inherent asymmetry of arrangement for sensing.

Thus, a differential capacitance torque sensor addressing the aforementioned problems is desired.

SUMMARY OF THE INVENTION

Embodiments of a differential capacitance torque sensor are similar to a conventional pivotal three-layer capacitive accelerometer, but utilize multiple constant voltage sources in order to decrease natural torsion frequency oscillations about the rotational axis for increasing sensor sensitivity, as well as compensate for inherent electrical asymmetries in the sensor. Embodiments of a differential capacitance torque sensor includes upper and lower fixed substrates, spaced apart and oriented parallel with respect to one another, first and second longitudinally opposed upper electrodes respectively secured to first and second longitudinally opposed ends of the upper fixed substrate, and first and second longitudinally opposed lower electrodes respectively secured to first and second longitudinally opposed ends of the lower fixed substrate. A longitudinally-extending, conductive proof mass is centrally positioned between the upper and lower fixed substrates, with the longitudinally-extending, conductive proof mass being pivotal about a central axis thereof.

A first end of the longitudinally-extending, conductive proof mass is positioned between the first upper electrode and the first lower electrode, defining a first upper capacitor having a first upper capacitance $C_1$ and a first lower capacitor having a first lower capacitance $C_2$, and a second end of the longitudinally-extending, conductive proof mass is positioned between the second upper electrode and the second lower electrode, defining a second upper capacitor having a second upper capacitance $C_3$ and a second lower capacitor having a second lower capacitance $C_4$.

A first voltage source having a voltage $V_1$ is electrically connected across the longitudinally-extending, conductive proof mass, the first upper capacitor and the second lower capacitor. A second voltage source having a voltage $V_2$ is connected in series with the first voltage source, the second upper capacitor and the first lower capacitor, such that the voltage $V_2$ is given by $$V_2 = \frac{\gamma}{\gamma+1} V_1,$$

where $\gamma$ is a parameter defined as $$\gamma = \frac{C_2 + C_3}{C_1 + C_4} - 1.$$

In an alternative embodiment, a third voltage source having a third voltage $V_3$ can be further connected in series with the second voltage source, such that the first, second and third voltages satisfy $$V_2 = \frac{\gamma}{1+\gamma} V_1 + \frac{1}{1+\gamma} V_3,$$

where $\gamma$ is defined as above.

These and other features of the present invention will become readily apparent upon further review of the following specification.

BRIEF DESCRIPTION OF THE DRAWINGS

Unless otherwise indicated, similar reference characters denote corresponding features consistently throughout the attached drawings.

DETAILED DESCRIPTION OF THE PREFERRED EMBODIMENTS

Figure 2:
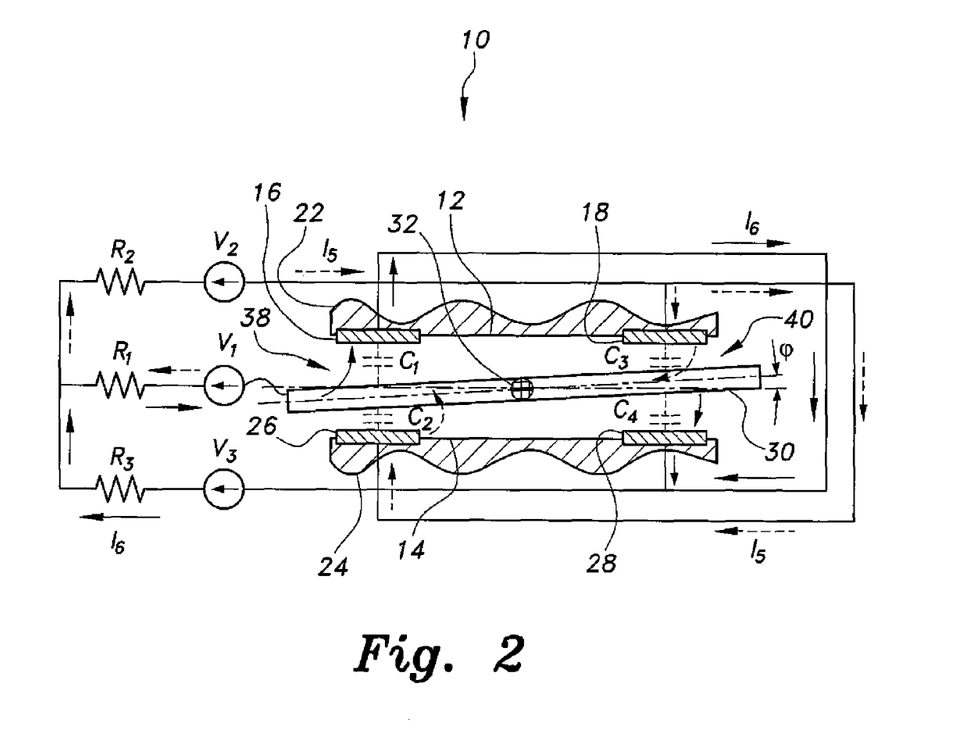
FIG. 2 schematically illustrates an alternative embodiment of the differential capacitance torque sensor according to the present invention.

Referring to FIGS. 1 and 2, embodiments of a differential capacitance torque sensor, such as a differential capacitance torque sensor 10, include a pair of static substrates 22 and 24, which have opposed parallel planar faces 12, 14, respectively. Static substrates 22, 24 are held fixed within, and with respect to, a suitable type of housing. Substrates 22 and 24 are spaced from one another and each has a pair of metal electrode elements deposited on the respective planar face thereof to form respective capacitor plates. As shown in FIGS. 1 and 2, capacitor plates 16 and 18 are fixed to planar face 12 of substrate 22 such that capacitor plates 16, 18 are positioned on laterally opposed ends of substrate 22, with respect to one another. Similarly, capacitor plates 26, 28 are positioned to mirror plates 16, 18, with capacitor plates 26 and 28 being fixed to planar face 14 of substrate 24 such that capacitor plates 26, 28 are positioned on laterally opposed ends of substrate 24, with respect to one another.

A proof mass 30 is flexibly suspended between substrates 22 and 24 by one or more rotational flexures 32, which can be suitably mounted, such as on the housing, for example. One end 38 of proof mass 30 is positioned between capacitor plates 16, 26, and the other laterally opposed end 40 is positioned between capacitor plates 18, 28. End 38 of proof mass 30 and plate 16 define a first capacitor $C_1$; end 38 and plate 26 define a second capacitor $C_2$; end 40 of proof mass 30 and plate 18 define a third capacitor $C_3$; and end 40 and plate 28 define a fourth capacitor $C_4$. Proof mass 30 can moves in response to action of inertial or gravity force moment being measure with respect to acceleration, thus changing its position relative to the static electrodes or capacitor plates 16, 18, 26, 28. This movement results in current in the set of capacitors $C_1$, $C_2$, $C_3$, $C_4$ whose difference (i.e., a "differential capacitance") is indicative of movement and/or acceleration and/or moment action. The ends 38, 40 of proof mass 30 are divided equally or substantially equally in length about the rotational flexure 32, which defines the axis of rotation. Similarly, each pair of plates 16, 18 and 26, 28 is positioned symmetrically with respect to rotational flexure 32 and the axis of rotation.

As shown in FIGS. 1 and 2, a first electrostatic voltage source $V_1$ (and corresponding series resistor $R_1$) is connected to capacitor plates 16, 18, 26, 28 and to conductive proof mass 30, with proof mass 30 having opposite polarity from the capacitor plates 16, 18, 26, 28, thus the electrical fields in capacitors $C_1$ and $C_3$ point in the same direction, and the electrical fields in capacitors $C_2$ and $C_4$ point in the same direction. This arrangement also leads to capacitors $C_1$ and $C_4$ being connected in parallel and, similarly, to capacitors $C_2$ and $C_3$ being connected in parallel. One can thus define two new resultant capacitances $C_5$ and $C_6$ such that $C_5 = C_1 + C_4$ and $C_6 = C_2 + C_3$. The corresponding currents are shown in FIGS. 1 and 2 as $I_5$ and $I_6$, respectively, and are used as outputs of the sensor's signals.

As opposed to a conventional differential capacitance sensor, embodiments of the differential capacitance torque sensor 10 include a second voltage source $V_2$ (and corresponding series resistor $R_2$), provided to compensate for the sensor's capacitive asymmetry, as shown in FIG. 1. The voltage of voltage source $V_2$ is dependent upon the voltage of voltage source $V_1$, according to the relation:

$$V_2 = \frac{\gamma}{1+\gamma} V_1, \tag{1}$$

where the parameter $\gamma$ is a parameter of the sensor's electrical asymmetry and satisfies the relation $C_6 = (1+\gamma)C_5$. This asymmetry exists in any differential capacitance sensor due a fabrication errors, etc. If voltage source $V_2$ is absent and the voltage $V_1$ is large enough, this capacitive asymmetry causes the well-known phenomenon of instability known in the art as "pull-in" (or "snap-down"). In this case, the PM irrepressibly rushes toward one of the electrodes after switching a voltage on. This imposes severe restrictions on the sensor sensitivity. As an example, in the interval $$0.2 < \frac{C_5 V_1^2}{k\varphi_m^2} < 0.25,$$

permissible values of $\gamma$ are in the interval $0.1 > \gamma > 0$. If the condition (1) is implemented, then the parameter $\gamma$ is not limited in the sensor.

The electrical charges are induced in the capacitors, which generate the force which attracts the proof mass 30 to the respective capacitor plates 16, 18, 26, 28, thus inducing mechanical torque in the proof mass 30. The induced forces cause additional negative elasticity, which acts opposite to the positive mechanical elasticity of the torsion suspension 32. Thus, these forces provide for reducing the total elasticity of the torsion of the proof mass 30's elastic torsion. The total elasticity of the torsion suspension is given by:

$$k_t = k - k_{el}, \quad (2)$$

where a negative elasticity is caused by electrical charges induced in the capacitors as (assuming that condition (1) is valid):

$$k_{el} = \frac{4C_5 V_1^2}{\varphi_m^2}, \quad (3)$$

where $C_5$ represents the capacitance of capacitors $C_5$ and $C_5$, which are equal to one another when the proof mass 30 is at rest or quiescent and equation (1) is fulfilled, and $\varphi_m$ is the proof mass 30's maximum possible rotation angle.

The values of voltage $V_1$ (if condition (1) is valid) define the resultant elasticity of the proof mass's torsion suspension and the resultant rotational resonant frequency about the axis of rotation, since the elasticity of the torsion suspension decreases as the voltage $V_1$ increases. The resonant frequency $\Omega$ is related to the voltage $V_1$ as:

$$V_1 = \frac{\varphi_m}{2} \sqrt{\frac{1}{C_5}(k - I_z \Omega^2)}. \quad (4)$$

The rotational resonant frequency of proof mass 30 is equal to the frequency of a periodic torque which acts on the proof mass 30, which is being measured, ensuring a maximal output signal for the sensor. Using differential capacitance torque sensor 10 as a torque sensor, output currents $I_5$ and $I_6$ can be monitored by external circuitry in order to give values of capacitances $C_5$ and $C_6$ (representing changes in velocity) and, by extension, the individual values of capacitances $C_1$, $C_2$, $C_3$ and $C_4$ (i.e., values of velocity change for these capacitors). As an example, if a torque is induced in the differential capacitance torque sensor 10 such that proof mass 30 rotates in a clockwise direction (in the orientation shown in FIG. 1), capacitance $C_1$ and capacitance $C_4$ will both increase, and capacitance $C_2$ and capacitance $C_3$ will both decrease. Thus, by detecting these current increases in capacitors $C_1$ and $C_4$, the torque is detected. In a similar manner, detection of equivalent current decreases in capacitors $C_2$ and $C_3$ would indicate a torque causing the proof mass 30 to rotate in a counter-clockwise direction.

As shown in FIG. 2, in embodiments of the differential capacitance torque sensor 10, a third voltage source $V_3$, and corresponding series resistor $R_3$, can be added to the accelerometer. The additional voltage source ensures that a distribution of electrical voltages between sources $V_1$ and $V_2$ are usable and suitable for fabrication. The voltage $V_3$ depends on voltages $V_1$ and $V_2$ according to:

$$V_2 = \frac{\gamma}{1+\gamma} V_1 + \frac{1}{1+\gamma} V_3. \quad (5)$$

The values of voltages $V_1$ and $V_3$ define the resultant elasticity of the proof mass's torsion suspension and the resultant rotational resonant frequency about the axis of rotation. The resonant frequency $\Omega$ is related to the voltages $V_1$ and $V_3$ as:

$$V_1 - V_3 = \frac{\varphi_m}{2} \sqrt{\frac{1}{C_5}(k - I_z \Omega^2)}. \quad (6)$$

The presence of a third voltage source is not obligatory in the sensor, but ensures a possibility to choose a value for voltage $V_2$. For example, when $V_3 = 0$, then $$V_2 = \frac{\gamma}{1+\gamma} V_1 \ll V_1, \text{ if } \gamma \ll 1.$$

However, if $$V_3 = \frac{V_1}{2},$$

then $$V_2 = \frac{1+2\gamma}{1+\gamma} \frac{V_1}{2} \approx \frac{V_1}{2}.$$

It should be noted that the differential capacitance torque sensor 10 is rotated with a constant or substantially constant angular speed when a constant or substantially constant input torque is measured. This can ensure the modulation of an input torque with a desired frequency, for example.

Figure 3:
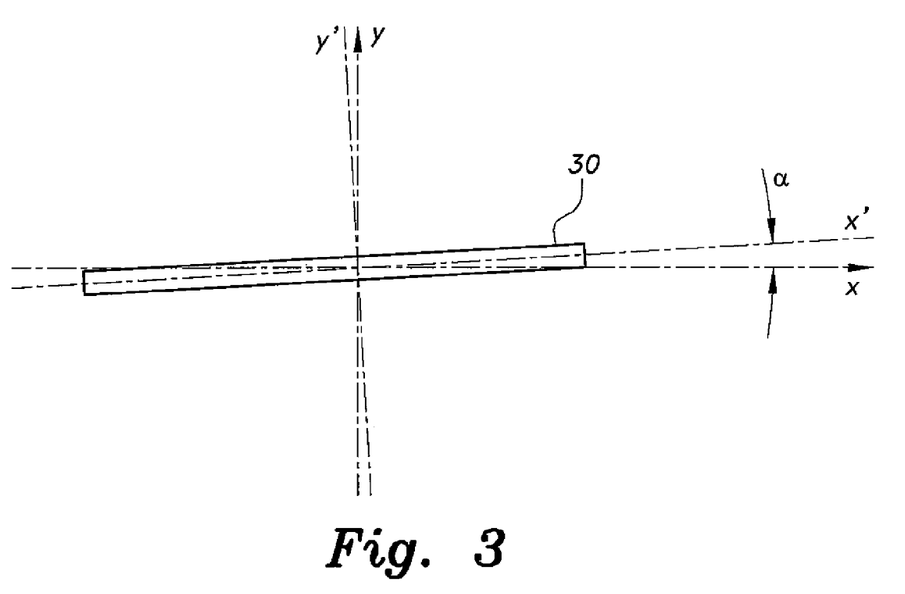
FIG. 3 diagrammatically illustrates rotational axes associated with a proof mass of the differential capacitance torque sensor according to the present invention.

The proof mass 30 is shaped such that it has at least two different principal moments of inertia with respect to the horizontal x-axis and the vertical y-axis. In the following, as illustrated in the diagram of FIG. 3, the x-axis and y-axis represent the stationary horizontal and vertical axes of the orientation of FIGS. 1 and 2. The longitudinal axis of proof mass 30 is represented by the x'-axis, with the angle between the x-axis and the x'-axis (i.e., the angle of rotation of proof mass 30), being represented as α. The y'-axis is orthogonal to the x'-axis, as shown. This can ensure the possibility of measuring the second derivatives of a gravitational potential by the differential capacitance torque sensor 10. For a gravitational potential $\Phi$, the corresponding second derivatives thereof are given by that $$\Gamma_x = \frac{\partial^2 \phi}{\partial x^2},$$

$$\Gamma_y = \frac{\partial^2 \phi}{\partial y^2};$$

and $$\Gamma_{xy} = \frac{\partial^2 \phi}{\partial x \partial y}.$$

The force moment M, or torque, acting on proof mass 30 is then given as:

$$M(\alpha) = (I_{x'} - I_{y'})\left[\frac{1}{2}(\Gamma_x - \Gamma_y)\sin 2\alpha + \Gamma_{xy}\cos 2\alpha\right], \quad (7)$$

where $I_{x'}$ and $I_{y'}$ are principal moments of inertia with respect to the x'-axis and y'-axis, respectively.

Principal moments of inertia $I_{x'}$, $I_{y'}$ and $I_{z'}$ of the PM follow to the condition:

$$|I_{x'} - I_{y'}| > 0.8 I_{z'}. \quad (8)$$

It is well know that, theoretically, in any hard body there is a condition $0 \leq |I_{x'} - I_{y'}| \leq I_{z'}$. In reality, it is not possible to receive the result $|I_{x'} - I_{y'}| = I_{z'}$. However, for any body which is symmetrical about the z'-axis, one has $|I_{x'} - I_{y'}| = 0$. This last equation is not applicable in the present sensor due to equation (7). The condition (8) is a compromise which can be realized in reality. However, for this aim, the PM has to have a definite shape, for example being elongated in the x'-axis direction. In this case, the principal moment of inertia $I_{x'}$ of the PM is minimal with respect to the x'-axis.

When the differential capacitance torque sensor 10 is used to measure the gravitational potential $\Phi$, the angular velocity $\omega$ of the sensor's rotation is chosen as half of the resonant frequency $\Omega$. As seen in relation (7), for example, the angular frequency of the turning moment corresponds to $\Omega$, because then it is $\phi = 2\omega t = \Omega t$. In this case, the in-phase component of the moment in equation (7) is:

$$M_{inph} = \frac{1}{2}(I_{x'} - I_{y'})(\Gamma_x - \Gamma_y) \quad (9)$$

and the out-of-phase component of the moment in equation (7) is:

$$M_{outph} = (I_{x'} - I_{y'})\Gamma_{xy}. \quad (10)$$

To measure the components $\Gamma_x - \Gamma_y$ and $\Gamma_{xy}$ of the second derivative of a gravity potential $\Phi$, one needs to single out these in-phase component and out-of-phase component in the moment (7). This is a standard operation which may be practiced using any well-known standard procedure, for example, with a synchronous detector or phase-lock detector.

The center of proof mass 30 is displaced along the y'-axis with minimum moment of inertia. This ensures for the sensor a possibility of measuring a linear acceleration or gravity force component which is orthogonal to the z-axis. This center mass displacement may be received without PM shape distortion, for example, if one were to implant a heavier material in the PM body.

If the frequency of input torque, which is measured, equals the frequency $\Omega$, the sensor output resultant resonant current is defined as:

$$I_{rez} = 2I_{5rez} \approx \frac{M_0 \sqrt{C_5(k - I_z\Omega^2)}}{D + \frac{1}{2}(k - I_z\Omega^2)C_5[R_2 + (1+\gamma)R_3]}, \quad (11)$$

where $M_0$ is an input torque amplitude, D is a viscous damping coefficient which defines a moment of friction force acting on PM in the sensor (when voltage sources are switched off), $R_2$ and $R_3$ are internal resistances of voltage sources $V_2$ and $V_3$.

As opposed to a conventional differential capacitance sensor, the present sensor compensates for any inherent current asymmetry. This compensation is provided when resistances $R_1$, $R_2$ and $R_3$ satisfy the relation $$R_2 = 2\gamma R_1 + (1+\gamma)R_3. \quad (12)$$

The total current $I_5 + I_6$ in the sensor can be measured. If condition (1) is satisfied, then this sum is given by:

$$I_{out} = I_5 + I_6 = -\frac{[2\gamma R_1 + (1+\gamma)R_3 - R_2](V_1 - V_3 + \Delta V_n)}{(1+\gamma)(R_1R_2 + R_1R_3 + R_2R_3)} - \frac{(1+\gamma)(2R_1 + R_3)q_1\left(1 + \frac{\varphi}{\varphi_m}\right) + (2R_1 + R_2)q_2\left(1 - \frac{\varphi}{\varphi_m}\right)}{C_5(1+\gamma)(R_1R_2 + R_1R_3 + R_2R_3)}, \quad (13)$$

where $\Delta V_n$ is a total noise voltage generated in the voltage sources $V_1$ and $V_3$, and $q_1$ and $q_2$ are charges are in capacitors $C_5$ and $C_6$. It is evident from equation (13) that, if in the sensor, condition (12) is satisfied, the first term in the right hand side of equation (12) is absent. Then, it follows from equations. (12) and (13) that $$I_{out} = I_5 + I_6 = -\frac{(q_1 + q_2) + (q_1 - q_2)\frac{\varphi}{\varphi_m}}{C_5[(1+\gamma)R_3 + \gamma R_1]}. \quad (14)$$

Thus, the condition (12) ensures a low electrical noise level in the present sensor.

Figure 4:
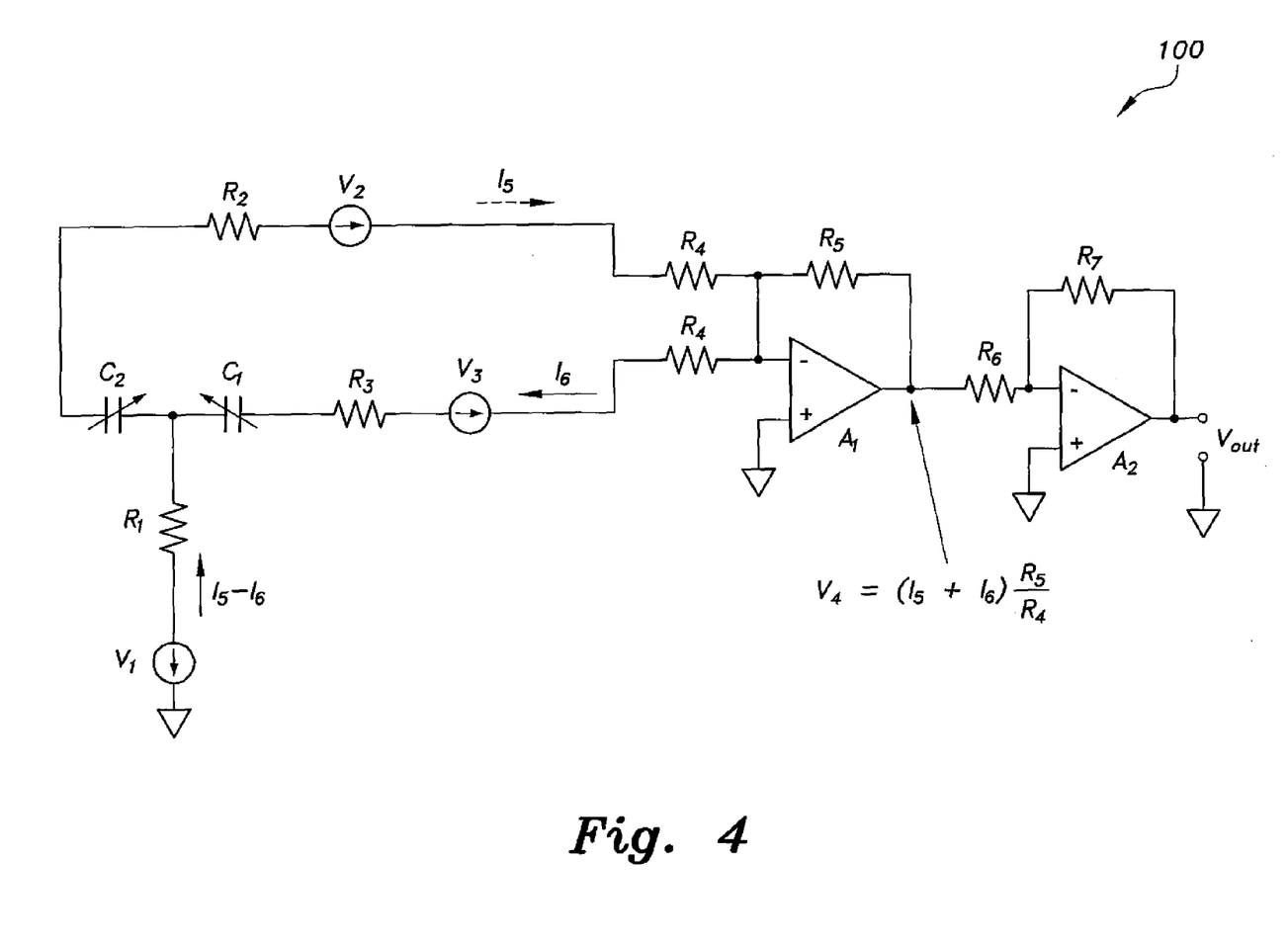
FIG. 4 is a schematic diagram of an alternative circuit used with the differential capacitance torque sensor of FIG. 2.

In the alternate circuit 100 of FIG. 4, three amplifiers $A_1$, $A_2$ and $A_3$ have been added to the circuit shown in FIG. 2. Amplifiers $A_1$ and $A_2$ act as current-to-voltage converters, such that voltage $$V_4 = (I_5 + I_6)\frac{R_5}{R_4}.$$

The amplifier $A_2$ produces the output voltage $$V_{out} = (I_5 + I_6)\frac{R_5}{R_4}\frac{R_7}{R_6} \approx 2I_5\frac{R_5}{R_4}\frac{R_7}{R_6}.$$

In a resonant mode, the output voltage $V_{out}$ is given by $$V_{out} = 2I_{5rez}\frac{R_5}{R_4}\frac{R_7}{R_6}.$$

It is to be understood that the present invention is not limited to the embodiments described above, but encompasses any and all embodiments within the scope of the following claims.

We claim:

1. A differential capacitance torque sensor, comprising:
a housing;
upper and lower fixed substrates being spaced apart and oriented parallel with respect to one another, said upper and lower fixed substrates being secured in said housing;
first and second longitudinally opposed upper electrodes respectively secured to first and second longitudinally opposed ends of said upper fixed substrate;
first and second longitudinally opposed lower electrodes respectively secured to first and second longitudinally opposed ends of said lower fixed substrate;
a longitudinally-extending, conductive proof mass centrally positioned between said upper and lower fixed substrates, said longitudinally-extending, conductive proof mass being pivotal about a central axis thereof, wherein a first end of said longitudinally-extending, conductive proof mass is positioned between said first upper electrode and said first lower electrode defining a first upper capacitor having a first upper capacitance $C_1$ and a first lower capacitor having a first lower capacitance $C_2$, a second end of said longitudinally-extending, conductive proof mass being positioned between said second upper electrode and said second lower electrode defining a second upper capacitor having a second upper capacitance $C_3$ and a second lower capacitor having a second lower capacitance $C_4$;
a first voltage source having a constant voltage $V_1$ electrically connected across said longitudinally-extending, conductive proof mass, said first upper capacitor and said second lower capacitor; and
a second voltage source having a constant voltage $V_2$ connected in series with said first voltage source, said second upper capacitor and said first lower capacitor, wherein the voltage $V_2$ is given by $$V_2 = \frac{\gamma}{\gamma+1}V_1,$$

wherein $\gamma$ is a parameter defined as $$\gamma = \frac{C_2 + C_3}{C_2 + C_4} - 1.$$

2. The differential capacitance torque sensor as recited in claim 1, wherein the voltage $V_1$ of the first voltage source is a function of a resonant frequency $\Omega$ associated with rotation of the longitudinally-extending, conductive proof mass, such that $$V_1 = \frac{\varphi_m}{2}\sqrt{\frac{1}{C_5}(k - I_z\Omega^2)},$$

where $\phi_m$ is a maximum rotation angle of the longitudinally-extending, conductive proof mass, k is an elastic constant associated with the longitudinally-extending, conductive proof mass, and $I_z$ is a moment of inertia of the longitudinally-extending, conductive proof mass about an axis of rotation thereof, where $C_5 = C_1 + C_4$.

3. A differential capacitance torque sensor, comprising:
a housing;
upper and lower fixed substrates being spaced apart and oriented parallel with respect to one another, said upper and lower fixed substrates being secured in said housing;
first and second longitudinally opposed upper electrodes respectively secured to first and second longitudinally opposed ends of said upper fixed substrate;
first and second longitudinally opposed lower electrodes respectively secured to first and second longitudinally opposed ends of said lower fixed substrate;
a longitudinally-extending, conductive proof mass centrally positioned between said upper and lower fixed substrates, said longitudinally-extending, conductive proof mass being pivotal about a central axis thereof, wherein a first end of said longitudinally-extending, conductive proof mass is positioned between said first upper electrode and said first lower electrode defining a first upper capacitor having a first upper capacitance $C_1$ and a first lower capacitor having a first lower capacitance $C_2$, a second end of said longitudinally-extending, conductive proof mass being positioned between said second upper electrode and said second lower electrode defining a second upper capacitor having a second upper capacitance $C_3$ and a second lower capacitor having a second lower capacitance $C_4$;
a first voltage source having a constant first voltage $V_1$ electrically connected across said longitudinally-extending, conductive proof mass, said first upper capacitor and said second lower capacitor;
a second voltage source having a constant second voltage $V_2$ connected in series with said first voltage source, said second upper capacitor and said first lower capacitor; and
a third voltage source having a constant third voltage $V_3$ connected in series with said second voltage source, wherein the first, second and third voltages satisfy $$V_2 = \frac{\gamma}{\gamma+1}V_1 + \frac{1}{1+\gamma}V_3,$$

wherein $\gamma$ is a parameter defined as $$\gamma = \frac{C_2 + C_3}{C_2 + C_4} - 1.$$

4. The differential capacitance torque sensor as recited in claim 3, wherein the voltage $V_1$ of the first voltage source is a function of the third voltage $V_3$ of the third voltage source and a resonant frequency $\Omega$ associated with rotation of the longitudinally-extending, conductive proof mass, such that $$V_1 - V_3 = \frac{\varphi_m}{2}\sqrt{\frac{1}{C_5}(k - I_z\Omega^2)},$$

where $\phi_m$ is a maximum rotation angle of the longitudinally-extending, conductive proof mass, k is an elastic constant associated with the longitudinally-extending, conductive proof mass, and $I_z$ is a moment of inertia of the longitudinally-extending, conductive proof mass about an axis of rotation thereof, where $C_5 = C_1 + C_4$.

* * * * *